G. L. HAUSSKNECHT.
Velocipede.
No. 99,567.
Patented Feb. 8, 1870.
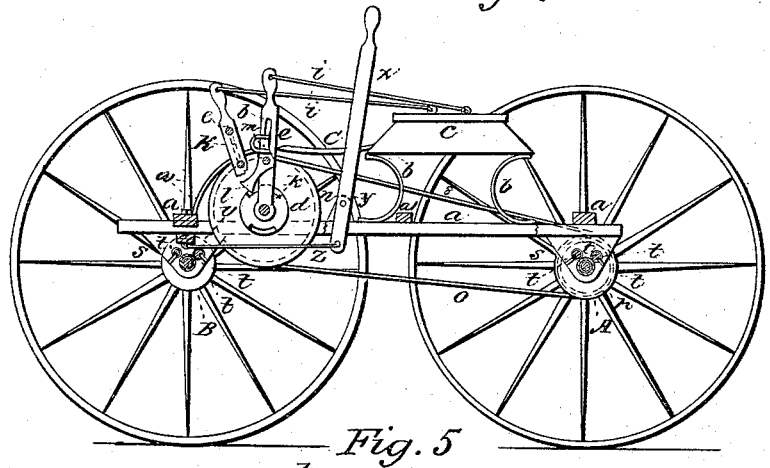
Fig. 1
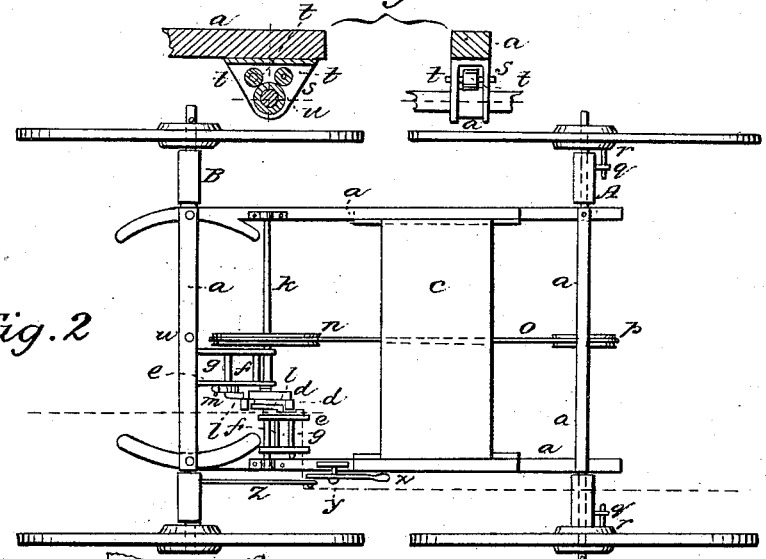
Fig. 5
Fig. 2
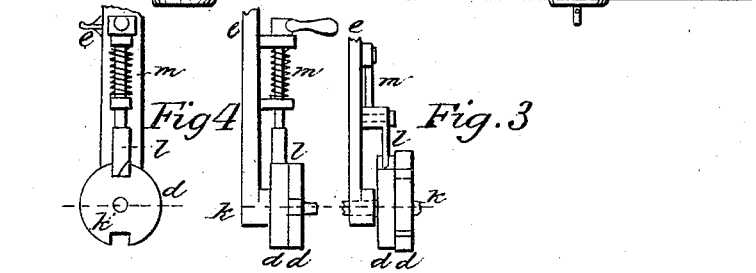
Fig. 4  Fig. 3
Fig. 4
Witnesses:
Albert Holz
William Taylor
Inventor:
G. L. Haussknecht

United States Patent Office.

GUSTAVUS L. HAUSSKNECHT, OF BROOKLYN, NEW YORK.

Letters Patent No. 99,567, dated February 8, 1870; antedated August 27, 1869.

---

IMPROVEMENT IN VELOCIPEDE.

---

The Schedule referred to in these Letters Patent and making part of the same.

---

Be it known that I, GUSTAVUS L. HAUSSKNECHT, of the city of Brooklyn, in the county of Kings, and State of New York, have invented a new and useful vehicle, for use on common roads, propelled or driven by the passenger or passengers, called Velocipede; and I do hereby declare that the following is a full, clear, and exact description of the construction and operation of the same, reference being had to the annexed drawings, making a part of this specification, in which—

Figure 1 is a side elevation, two of the running-wheels being removed.

Figure 2 is a plan or top view.

Figure 3 is a section of a driving or operating treadle-lever, with reversely-operating dog and notched wheel.

Figure 4ª, is a section of a lever, with a differently arranged dog.

Figure 4ᵇ, is a transverse view of the latter.

Figure 5 represents a view from front or rear of the construction and arrangement of journal-boxes, and a view of a transverse section thereof.

The same letters of reference denote similar parts of said figures.

$a\ a\ a\ a$ is the carrying-frame.

$b\ b$, the springs supporting the seat $c$, or body of the vehicle, from which one or more persons, with their feet or hands, can operate the driving, the backing or stopping, the steering or turning, and the braking-arrangements of the vehicle, each foot or hand of the person imparting an intermittent circular motion to the notched wheels $d\ d$, by operating the double levers $e\ e$ forth and back alternately, thereby imparting a continuous circular motion to the said notched wheels and shaft $k$.

Said double levers are provided with rigidly-fixed treadle-bars $f f$, to which the feet of the operator are strapped, or otherwise attached, for the purpose of drawing the lever back after reaching the limit of working motion.

$g\ g$ are extra movable treadle-bars, sliding in slots $h\ h$, of said levers, provided to be regulated and set according to the length of the legs of the operator, or the required power for driving the vehicle over rough roads, or ascending hills. A nut is employed on one side, to fasten a bolt which passes through said extra treadle-bars, or otherwise the same may be secured.

$i\ i$ is a rod or bar, attached and jointed in a suitable position to each of said treadle-levers, for the purpose to operate the said treadle-levers by hand, pushing and pulling said rods forth and back.

The lower ends of said treadle-levers are provided with eyes, inlaid with leather boxes, to prevent rattling and turning around the driving-shaft $k$.

Each of said treadle-levers is provided with a pawl or dog, $l$, turning on a pin attached to said lever, and made to fall into the notches of said notched wheel by the pressure of a steel spring, $m$, or a rubber spring attached thereto, or by a spiral spring, $m$, or rubber tube, pressing on a shoulder of dog $l$, shown in fig. 4ª and fig. 4ᵇ.

When imparting circular motion to said notched wheels, the pawl or dog is pressed with one side against a side of the notch. The other side of said pawl or dog is made bevelling, to allow the lifting of said pawl or dog. When the lever stops, and the other side of the notch strikes the dog, it will be seen that said pawls or dogs can be reversed by turning over, while in fig. 4ª and fig. 4ᵇ, the dog turns around by turning on a little handle working in two eyes attached to the treadle-lever, for the purpose of stopping or reversing the motion of the vehicle.

The said treadle-levers will strike the front bar $a$ of the carrying-frame, intended to limit the working-motion of the operator.

Before reaching the dead-point of applying power, another bar, $a'$, is provided, fastened about midway of the side pieces of said carrying-frame, for the same purpose when driving in opposite direction, or for stopping. When one lever is striking, the other lever is drawn back to an upright position, ready to work.

Any number of pairs of said treadle-levers may be adopted and used by the same number of persons, or, if not used, may be set out of work, by turning or attaching the dog, that the spring cannot press it into the notch. In fig. 4ª, the handle is raised to rest upon a lip on one side of said treadle-lever; turning the dog in an opposite direction of the working-motion, it will stop the vehicle, as said before, the treadle-lever striking the bar. Said springs, by their pressure, will prevent rattling of the pawls or dogs, in whatever position.

The said notched wheels are provided with at least two notches, set for alternate motion, and made fast to the driving-shaft $k$, which runs on each end in journals, and is fastened to the side pieces of said carrying-frame.

In the middle of said driving-shaft is fastened a pulley-wheel, $n$, over which an endless band, chain, or belt, $o$, passes, communicating the circular motion, imparted, as described, by said notched wheel, shaft, and pulley, to another pulley, $p$, fastened in the middle of the hind axle A, on the ends of which the running-wheels are made to revolve.

A projection, $q$, is attached to the hind axle.

Another projection, $r$, is attached to the hub, through which the hind wheels, or either of them, receive the circular motion of the hind axle, causing the wheels to run over the ground forth and back, or to stop.

The said hind axle A is passing loosely through two metallic journal-boxes, s s, fastened under the hind ends of the side pieces a a of the carrying-frame, supporting the same. Said journal-boxes are so arranged that in upsetting the vehicle, the axle cannot lose its proper bed or bearing, and are constructed to keep out the dust rising from the ground. In operating, the axle does not run on, or touch the said boxes.

In order to reduce friction, I provide said journal-boxes with two friction-rollers, t t, working on pins, or in journals bedded into said journal-boxes, placing said rollers in central positions, thereby giving the said journals of each box, a uniform bearing and consequent uniform wear, forming a bed underneath of them for the said axle to rest or travel in, the said friction-rollers to travel over the surface of said axle in the same line or track with equal pressure or bearing, travelling also in uniform direction, and with uniform velocity on each axle.

I firmly surround the travelling-surface of said axle with a collar, u u, made of leather, or other suitable substance, of sufficient width and thickness, fitting between the two sides of said journal-boxes, and running against them, keeping the upper part of the vehicle in proper position, preventing a rattling sound of said friction-rollers running on the axle, and a rattling noise, which would be produced by iron or metal collars striking and running against the sides of the journal-boxes.

The side pieces of the carrying-frame, which properly may be termed reaches, communicate the driving motion to the front running gear.

B is the front axle, on the ends of which the running-wheels revolve in the usual way, the bearing and friction being too large on the ends of the axle for easy running. I therefore employ the same constructed friction-roller boxes, with their arrangements, as described, for the hind axle to run in, to reduce friction, and construct the front running gear accordingly.

The front axle B will revolve in circular motion with the wheels, except when in turning or passing over obstacles on the road, one wheel has to describe a larger circle, or longer track, than the opposite wheel of the same axle. If either of the said axles were made fast to both its running-wheels, a sliding of the wheels upon the ground would result in turning or passing over obstacles, by allowing the running-wheels to revolve on the ends of the axles, in combination with the rotary motion of axles with the wheels, such sliding of the wheels upon the ground is avoided.

In the construction of the front running gear, the said friction-roller journal-boxes are firmly attached to the ends of a cross-bar, v, keeping in parallel position with the front axle, and swiveling or working from a king-bolt, w, in centre line of said bar, and passing through the centre line of the front cross-bar a of the carrying-frame, connecting the front turning-part to the carrying-frame, which is supported by the said front journal-boxes, sliding under sweeps or segments circling from the king-bolt, attached or made fast to the front ends of said reaches a a, causing sufficient bearing or friction to keep the front axle in a steady position in running the vehicle on common roads.

The bars v and a, in front, should be so arranged, with a little opening between them, that by tightening or loosening the nut of said king-bolt, the friction can be regulated to accomplish the desired object of keeping the front axle steady when running.

It will be observed that the before-described friction-roller journal-boxes, with their arrangements, and the construction of the front turning-arrangement, are applicable to running gears of vehicles drawn by horses, where the draught is communicated in the usual way.

The steering-arrangement consists of a lever, x, with a handle on the upper end, working on a pin, y, fastened to a piece attached to said side pieces a a of the carrying-frame.

The lower end of said lever forms a universal joint with a connecting-rod or bar z, which is working on a pin or joint formed on the side of said front journal-boxes, or ends of said cross-bar v.

The steering and turning are accomplished by moving the handle of the lever forth or back, to alter the position of the front axle to the vehicle, and regulating the curve for the running-wheels to run in, by the pressure of said lever brought upon the front friction-roller journal-boxes, which communicate the same to the rotating front axle, and thence to the revolving wheels on the ends thereof. For the safety and convenience of the operator, it is necessary of operating the front axle and wheels for steering, as the operator cannot watch the hindrances of his course, and at the same time watch the operation of the steering-gear behind.

In going down hill, it becomes necessary to lessen or regulate the speed of the velocipede before described, and to perfect the working-arrangements, a band, C, of rubber, iron, or other suitable material, is attached, with one end to the front cross-bar a of the carrying-frame, the other end being attached to the seat. A pull or pressure on said band will bring it in contact with the driving-belt o or pulley n. The pressure applied will regulate the speed of the velocipede by the friction produced by said band C acting as a brake.

It will be observed that the said treadle-levers and notched wheels may be attached to the driving-axle, and the working-arrangement constructed accordingly, or other various modifications of the several parts of the before-described vehicle, may be made, or may be necessary, according to the description of vehicles they are required to be applied to.

In the construction of running gears of vehicles or land-conveyances, I claim—

1. The herein-described device, of providing said rotating axles A or B with anti-rattling collars, u u, made of leather, or suitable material, in combination with the friction-rollers t t, with journal-boxes s s, arranged and operating together, substantially as described and set forth.

2. The rotating axles A or B, in combination with the hubs of wheels revolving on the ends of said axles, and the friction-rollers t t, with journal-boxes s s, the whole being arranged and operating together, substantially as described and set forth.

3. For the turning-arrangement, the combination of front axle B with the front wheels, the journal-boxes s s, cross-bar v, reaches a a, with front cross-bar a, coupled by king-bolt w, being arranged and operating in a one plane movement, substantially as described, for the purposes set forth.

4. In the driving or propelling-arrangement of the vehicle, the manner of producing rotary motion of the notched wheels d d and shaft k, by the alternate working forth and back of the treadle-levers e e, said levers being provided with pawls or dogs l l, operating on notched wheels d d, substantially as described and set forth, or the equivalents thereto.

5. The additional movable treadle-bars g g, sliding in slots h h of said treadle-levers, for operating said levers, substantially as described, and for the purposes set forth.

6. The rods or bars i i, jointed to the treadle-levers, for operating said treadle-levers, arranged substantially as described, for the purpose set forth.

7. The employment of bars a and a', for the purpose of limiting the alternate motion of treadle-levers, in combination with the said treadle-levers, its appurtenances, and the notched wheels, substantially as described and set forth.

8. The combination of bars $a$ and $a'$, the treadle-levers $e\ e$, notched wheels $d\ d$, and reversible dogs or pawls $l\ l$, for the purpose of stopping the running motion of the vehicle, substantially as described and set forth.

9. For the steering-gear of the vehicle, the herein-described device of the combination of rotating front axle B, with both front wheels running over the ground, and the friction-roller journal-boxes $s\ s$, with friction-rollers $t\ t$, the whole being actuated and working from the king-bolt $w$ by means of lever $x$ and connecting-rod $z$, and communicated substantially as described, for the purposes set forth.

10. For braking the velocipede, the band or belt C, of suitable material, to regulate the speed of the velocipede in descending hills, arranged and operating substantially as described and set forth

GUSTAVUS L. HAUSSKNECHT.

Witnesses:
ALBERT HOLLY,
WILLIAM TAYLOR.